United States Patent
Davidson et al.

(10) Patent No.: US 9,729,625 B1
(45) Date of Patent: Aug. 8, 2017

(54) PERSONAL CLOUD NETWORK

(75) Inventors: Troy Davidson, Clinton, UT (US); Jon Huberman, Rancho Santa Fe, CA (US); Brian R. Gruttadauria, Sutton, MA (US); Gary Poppitz, Roy, UT (US); Dennis Millard, Roy, UT (US)

(73) Assignee: LENOVOEMC LIMITED, Quarry Bay (HK)

( * ) Notice: Subject to any disclaimer, the term of this patent is extended or adjusted under 35 U.S.C. 154(b) by 726 days.

(21) Appl. No.: 12/828,093

(22) Filed: Jun. 30, 2010

(51) Int. Cl.
*G06F 15/16* (2006.01)
*H04L 29/08* (2006.01)

(52) U.S. Cl.
CPC .................................. *H04L 67/104* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 7,320,027 | B1* | 1/2008 | Chang | H04L 29/12377 709/219 |
| 8,285,817 | B1* | 10/2012 | Balasubramanian et al. | 709/219 |
| 8,296,763 | B1* | 10/2012 | Peercy | H04L 63/10 713/161 |
| 2003/0212801 | A1* | 11/2003 | Yang-Huffman | H04L 69/16 709/228 |
| 2006/0090195 | A1* | 4/2006 | Pearson | H04L 67/02 726/3 |
| 2006/0107010 | A1* | 5/2006 | Hirezaki et al. | 711/165 |
| 2007/0029373 | A1* | 2/2007 | Bumiller | G06Q 10/047 235/375 |
| 2007/0220248 | A1* | 9/2007 | Bittlingmayer et al. | 713/100 |
| 2007/0244899 | A1* | 10/2007 | Faitelson | G06F 21/604 |
| 2008/0134316 | A1* | 6/2008 | Devonshire et al. | 726/15 |
| 2008/0288498 | A1* | 11/2008 | Hinshaw | G06F 17/30575 |
| 2009/0024931 | A1* | 1/2009 | Bae | G06F 21/6218 715/748 |
| 2009/0276501 | A1* | 11/2009 | Saito | H04L 12/58 709/206 |
| 2010/0241980 | A1* | 9/2010 | Sosnosky et al. | 715/769 |
| 2010/0325423 | A1* | 12/2010 | Etchegoyen | H04L 63/0428 713/153 |
| 2011/0010437 | A1* | 1/2011 | Christenson | H04L 12/00 709/222 |
| 2011/0072126 | A1* | 3/2011 | Wujuan et al. | 709/224 |

OTHER PUBLICATIONS

My Book World Edition User Manual, Oct. 2009.*

* cited by examiner

*Primary Examiner* — Hee Soo Kim
(74) *Attorney, Agent, or Firm* — John L. Rogitz; John M. Rogitz

(57) ABSTRACT

A distributed storage space for individual users and their selected peers is provided. The personal cloud system allows an individual user to establish and maintain a shared data storage area on a network attached storage device connected to the individual user's private network and accessible to one or more network devices via a public network and the private network. The personal cloud system registers the shared data storage area with a central server and sends an invitation to one or more network peers to join the shared data storage area. The personal cloud system then monitors incoming data packets at the network attached storage device to identify requests from invited network peers to access the shared data storage area. Access is provided in accordance with predetermined access controls upon validation of the request.

18 Claims, 4 Drawing Sheets

PERSONAL CLOUD NETWORK

BACKGROUND

Field of the Invention

The present invention generally relates to networking communications and data storage and more specifically relates to establishing and maintaining secure distributed shared storage space for individual users and their selected peers over a public and private network infrastructure.

Related Art

Conventional network based data storage solutions typically require the resources of a large company to host network accessible storage space for individual users. Additionally, sharing files and data between individual users in typical conventional network implementations is either not allowed or is limited to a put and retrieve model. Examples of such conventional systems include file transfer protocol ("FTP") servers and virtual private network ("VNP") providers. FTP and VPN both suffer from complicated administration by the provider and require individual users to store files and data on the FTP or VPN provider's storage units. Therefore, what is needed is a system and method that overcomes these significant problems found in the conventional systems as described above.

SUMMARY

Accordingly, described herein are systems and methods that provide distributed shared storage space for individual users and their selected peers. The personal cloud network system described herein allows an individual user to establish and maintain a shared data storage area on a network attached storage device connected to the individual user's private network and accessible to one or more network peer devices via a public network and the private network. The personal cloud system registers the shared data storage area with a central server and sends an invitation to one or more network peers to join the personal cloud. The personal cloud system then monitors incoming data packets at the network attached storage device to identify requests from invited network peers to access the shared data storage area. Access is provided in accordance with predetermined access controls upon validation of the request.

In one embodiment, the personal cloud system comprises a network attached storage device connected to a private network and including a non-transitory computer readable medium for storing data and computer executable programmed modules and a processor communicatively coupled with the non-transitory computer readable medium for executing programmed modules stored therein. The system also includes a host module stored in the non-transitory computer readable medium on the network attached storage device and configured to initiate a shared data storage area on the network attached storage device.

The system further includes a lookup server communicatively coupled with the network attached storage device via a public network and said private network, the lookup server comprising a non-transitory computer readable medium for storing computer executable programmed modules and a processor communicatively coupled with the non-transitory computer readable medium for executing programmed modules stored therein. The lookup server includes a lookup module stored in the non-transitory computer readable medium on the lookup server and configured to receive requests for information related to shared data storage areas initiated by the host module, validate said requests and respond to said requests with shared data storage area access information.

Additionally, the system includes a client module stored in a non-transitory computer readable medium on a network device communicatively coupled with the lookup server via a public network and communicatively coupled with the network attached storage device via a public network and said private network, wherein the client module is configured to provide a shared data storage area identifier and an access code to the lookup module, receive shared data storage area access information in response, and initiate a connection over a public network and said private network using said shared data storage area access information to gain access to the shared data storage area on the network attached storage device.

In a further embodiment, the personal cloud system provides a shared data storage area by requesting an internet protocol address for the network attached storage device from a lookup server, receiving the internet protocol address for the network attached storage device in response to the request, determining a shared data storage area identifier, combining the shared data storage area identifier and the internet protocol address to generate a variable, sending said variable to the lookup server for registration of the shared data storage area; and monitoring incoming data packets from one or more network devices to identify requests to access the registered shared data storage area.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide systems and methods for establishing and maintaining secure distributed shared storage space for individual users and their selected peers over a public and private network infrastructure. For example, one method as disclosed herein allows a user to establish a shared storage space on a network attached storage device and securely share the shared storage space with network peer users operating on network devices that are connected to the network attached storage device via a public and private network infrastructure.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims. The present description of an example embodiment will be provided in the context of a network attached storage device as the host of the shared storage area although alternative embodiments may use alternative devices to host the shared storage area. Similarly, the present description of an example embodiment will use the term "personal cloud" as referring to the shared storage area system.

Figure 1:
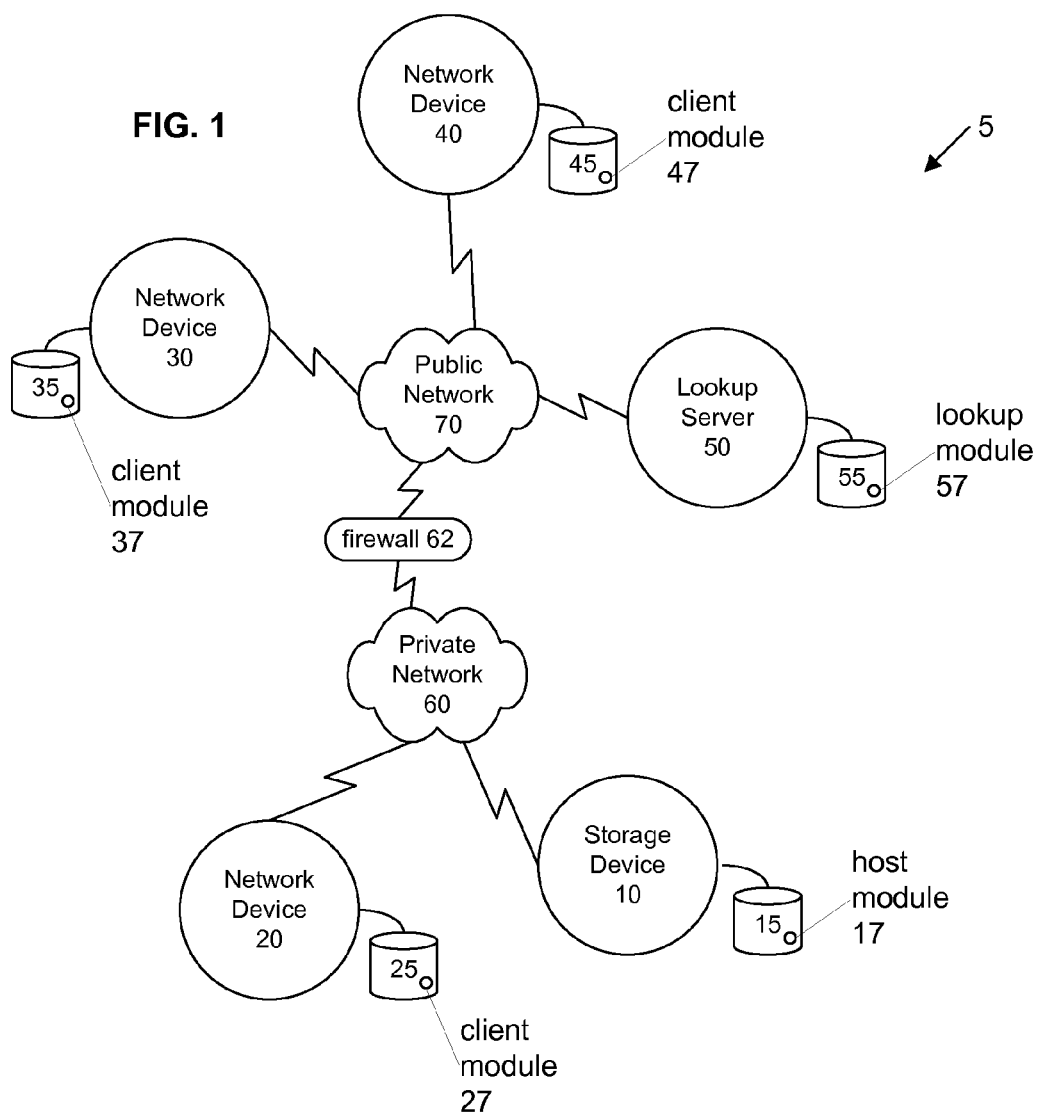
FIG. 1 is a network diagram illustrating an example system for distributed shared storage space according to an embodiment of the present invention.

FIG. 1 is a network diagram illustrating an example system 5 for distributed shared storage space according to an embodiment of the present invention. In the illustrated embodiment, the system 5 comprises a storage device 10 having a data storage area 15 and a host module 17 resident on the data storage area 15. The storage device 10 is connected to a network device 20, which similarly has a data storage area 25 and a client module 27 resident on the data storage area 25. The storage device 10 and network device 20 are connected via private network 60 that may optionally be separated from a public network 70 by one or more firewalls 62.

The storage device 10 is also connected to a plurality of network peer devices 30 and 40 (there can be more) and each of the network peer devices 30 and 40 similarly have data storage areas 35 and 45 and client modules 37 and 47 resident on the data storage areas 35 and 45. Additionally, the system 5 includes a lookup server 50 that is connected to the network peer devices 30 and 40 via the public network 70 and connected to the network peer device 20 and storage device 10 via the public network 70 and the private network 60. The lookup server 50 also has a data storage area 55 and a lookup module 57 resident on the data storage area 55.

The public network 70 can be any of a variety of wired and/or wireless networks that operate using a variety of communication protocols to facilitate data communications between devices. In one embodiment, the public network 70 includes the ubiquitous Internet. The private network 60 can also be any of a variety of wired and/or wireless networks that operate using a variety of communication protocols to facilitate data communications between devices. In one embodiment, the private network 60 is a residential local area network.

Each of the various storage areas shown in FIG. 1 include non-transitory computer readable media and can be used to store data including computer programs and executable instructions that can be carried out by a processor of the device to which the storage area is connected.

In practice, the system 5 allows the host module 17 on the storage device 10 to establish a shared data storage area as a portion of the storage area 15 and register the shared data storage area with the lookup server 50. The host module 17 can also invite network peers to join the shared data storage area by sending them the personal cloud name that is registered with the lookup server 50 and an access code. A client module on a network device contacts the lookup server 50 and provides the personal cloud name and access code and receives administrative information from the lookup server 50 that enables the client module to access the shared data storage area on the storage device 10. The client module uses the administrative information (e.g., an internet protocol ("IP") address and a port number) to contact the storage device 10 and upon validation of the access request by the host module 17, the client module is provided access to the shared data storage area.

Figure 2A:
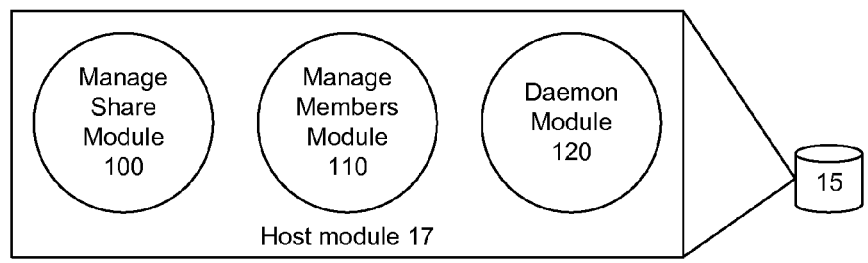
FIG. 2A is a block diagram illustrating an example host module according to an embodiment of the present invention.

FIG. 2A is a block diagram illustrating an example host module 17 according to an embodiment of the present invention. In the illustrated embodiment, the host module 17 resides in data storage on the storage device and comprises a manage share module 100, a manage members module 110 and a daemon module 120. Data storage area 15 in which the host module 17 is stored is also shown.

The manage share module 100 is configured to establish, maintain and delete a personal cloud shared data storage area. In one embodiment, the manage share module 100 establishes a personal cloud by registering a shared data storage area with the lookup server. This is accomplished by in part by sending a request to the lookup server to obtain certain information about the storage device. For example, the manage share module 100 sends a request seeking the IP address of the storage device. Once that information is obtained, the manage share module 110 combines the IP address with a key value that is specific to the host device and combines them into a variable that is provided to the host. Advantageously, the variable may be used to encode and decode any or all communications between the host device and the lookup server. The manage share module 100 provides the lookup server with administrative information about the shared data storage area (e.g., personal cloud name and port number) to register the personal cloud with the lookup server. When that information is provided to the lookup server, it may be encrypted using the variable.

The manage share module 100 is also configured to modify, delete and transfer personal clouds. In one embodiment, this is accomplished by sending authentication information to the lookup server along with instructions related to modifying, deleting and/or transferring a personal cloud. For example, the manage share module 100 may send the personal cloud name and email address of the owner to the lookup server along with an instruction to delete the personal cloud or to change the name of the personal cloud or the change the owner's email address or to change other related information for the personal cloud. Additionally, the manage share module 100 may instruct the lookup server to transfer the personal cloud to the current network device (e.g., the device from which the validation information and instruction is being sent).

The manage members module 110 is configured to add and delete members of the personal cloud. For example, once a personal cloud is registered, the manage members module 110 can generate an access code and send invitations to network peers to join the personal cloud. For example, a network peer can be identified by an email address and the manage members module 110 generates an email invitation including the personal cloud name and the access code. The email invitation is then sent to the email address of the network peer and the information in the email can then later be used by the network peer (e.g., from one or more network devices) to obtain the necessary administrative information to join the personal cloud and thereby access the shared data storage area.

The daemon module 120 is configured to monitor the predetermined personal cloud port for requests to access the shared data storage area. In one embodiment, the daemon module 120 handles requests related to the shared data storage area by passing such requests to related modules in order to free up the daemon module 120 for handling additional requests and allowing specific modules to implement specific functions such as implementing access controls and transferring data to and from a peer network device.

Figure 2B:
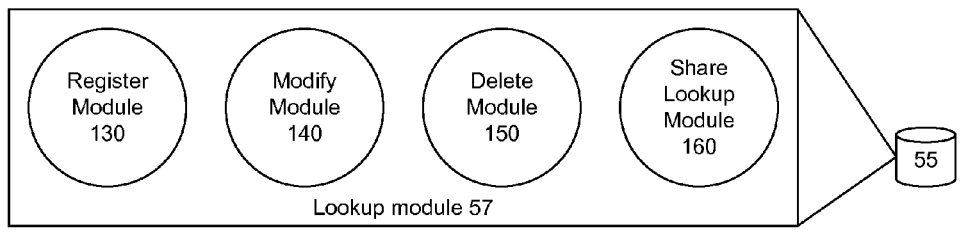
FIG. 2B is a block diagram illustrating an example lookup module according to an embodiment of the present invention.

FIG. 2B is a block diagram illustrating an example lookup module 57 according to an embodiment of the present invention. In the illustrated embodiment, the lookup module 57 resides in data storage on the lookup server and comprises a register module 130, a modify module 140, a delete module 150 and a share lookup module 130. Data storage area 55 in which the lookup module 57 is stored is also shown.

The register module 130 is configured to operate in cooperation with a manage module on a storage device to establish a personal cloud shared data storage area on the storage device. In one embodiment, the register module 130 receives an initial request from a storage device and in response to the request the register module 130 sends the IP address of the storage device back to the storage device.

Subsequently, the register module 130 receives a registration request from the storage device. The registration request includes administrative information to implement the personal cloud shared data storage area. For example, the registration information may include a name for the personal cloud, the IP address of the storage device, and the port number on the storage device that the daemon module will monitor for incoming requests related to the shared data storage area. The register module 130 stores this administrative information in its data storage area 55 for use when responding to future lookup requests from network peers. Once the administrative is stored by the register module 130, the personal cloud shared data storage area is considered registered.

The modify module 140 and delete module 150 both operate in cooperation with a manage module on a storage device to manage the administrative information related to a personal cloud shared data storage area. In one embodiment, the modify module 140 is configured to modify information related to a personal cloud and transfer a personal cloud while the delete module 150 is configured to delete a personal cloud. For example, modification of a personal cloud may include changing the name, IP address, an email address, a port number, or other related information about the personal cloud that is stored at the lookup server. Additionally, deletion of a personal cloud may include deleting the administrative information related to the personal cloud and may also include the modify module 140 instructing the storage device to delete the actual data that is stored in the shared data storage area.

With respect to transferring a personal cloud, this operation may include changing an IP address, email address or port number associated with the personal cloud (each of which may also be considered a modification). However, transferring may also include copying or moving the shared data storage area from one storage device to another storage device. For example, the modify module 140 may receive an instruction from the storage device to transfer the personal cloud shared data storage area to a new storage device. In such a case, the modify module 140 may update the administrative information (e.g., IP address) for the personal cloud and the modify module 140 may also instruct the old storage device to copy or move the actual data that is stored in the shared data storage area to the new storage device. The modify module 140 may also instruct the old storage device to delete the copied data that is stored in the shared data storage area after the copy transaction is successfully completed. As will be understood, moving the data implies that the data is both copied to the new device and deleted from the old device.

The share lookup module 160 operates in cooperation with a client module to facilitate network peers joining an existing personal cloud shared data storage area to which the network peer has been invited. In one embodiment, the share lookup module 160 receives a lookup request from a client module that includes validation information about the personal cloud. For example, the validation information may include one or more of: the personal cloud name, an access code, the IP address of the storage device, a designated port number of the storage device, a password, a group identifier, and the previously described variable, just to name a few. Additional or other validation information may also be employed. Once the share lookup module 160 receives the lookup request, the share lookup module 160 validates the lookup request and responds to the client module with administrative information that will allow the client module to access the shared data storage area on the network storage device. For example, the administrative information may include the IP address and a designated port number of the network storage device.

Figure 2C:
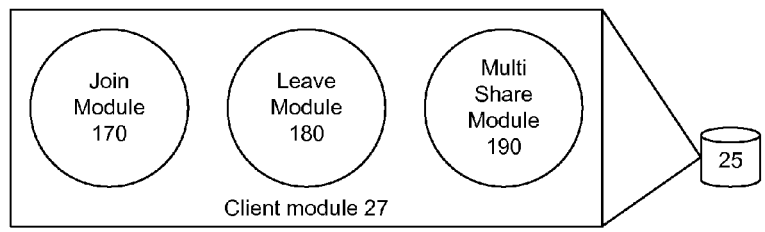
FIG. 2C is a block diagram illustrating an example client module according to an embodiment of the present invention.

FIG. 2C is a block diagram illustrating an example client module 27 according to an embodiment of the present invention. In the illustrated embodiment, the client module 27 resides in data storage on a network device and comprises a join module 170, a leave module 180 and a multi-share module 190. Data storage area 25 in which the client module 27 is stored is also shown.

The join module 170 is configured to operate in cooperation with the lookup module and the host module to facilitate access to a personal cloud shared data storage area by the network device. In one embodiment, the join module 170 receives administrative join information related to a personal cloud from a host module. For example, the administrative join information may include a personal cloud name and an access code and may be received via a data communication from the host module. Alternatively, the administrative join information may be received as data input from a user, for example the user may input the join information provided in the invitation to join email.

After receipt of the administrative join information, the join module 170 uses the administrative join information to query the lookup server for the administrative access information needed to directly access the personal cloud shared data storage area. In response, the join module 170 receives the administrative access information from the lookup server. For example, the administrative access information from the lookup server may include the IP address of the storage device and the port number at the storage device that is being monitored for incoming requests related to the shared data storage area. The join module 170 may store the administrative join information and the administrative access information in a non-transitory data storage area for long term storage.

Upon receiving the administrative access information, the join module 170 may be configured to use the administrative access information to automatically access the shared data storage area.

The leave module 180 is configured to facilitate withdrawal of the client module from the personal cloud shared data storage area. In one embodiment, the leave module 180 is configured to move or copy shared data from the personal cloud to a local storage area prior to complete withdrawal from the personal cloud.

Advantageously, such a withdrawal allows a network peer to depart the personal cloud with a current snapshot of the shared data stored in the personal cloud.

The multi-share module 190 operates in conjunction with one or more host modules to facilitate access to a plurality of personal cloud shared data storage areas from a single network device. In operation, the multi-share module 190 may establish and maintain simultaneous connections with a single storage device that is hosting multiple shared data storage areas via multiple different port numbers. Alternatively, the multi-share module 190 may establish and maintain simultaneous connections with a plurality of storage devices that each are hosting one or more shared data storage areas via one or more port numbers. As will be understood, an IP_address:port_number combination can be used to define separate personal cloud shared data storage areas in combination with a daemon module that monitors each IP_address:port_number combination.

Figure 3:
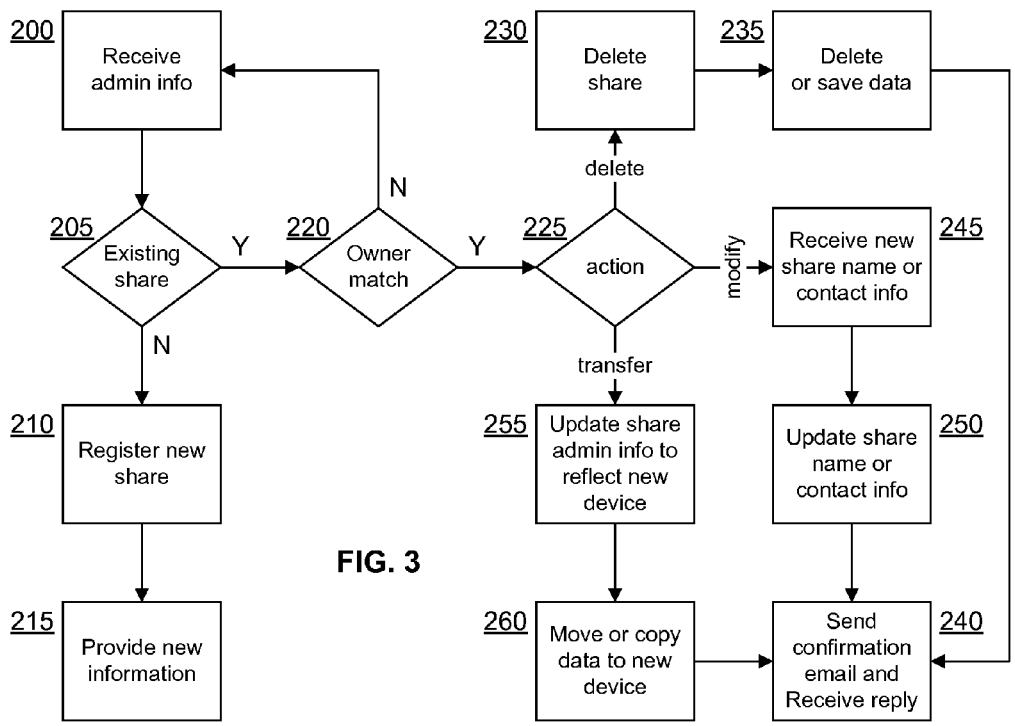
FIG. 3 is a flow diagram illustrating an example process for registering new and managing existing distributed shared storage spaces according to an embodiment of the present invention.

FIG. 3 is a flow diagram illustrating an example process for registering new and managing existing distributed shared storage spaces according to an embodiment of the present invention. In one embodiment, the process may be implemented by a lookup module such as previously described with respect to FIGS. 1 and 2B. Initially, in step 200 the lookup module receives certain administrative information about a personal cloud shared data storage area from the host module. Next, in step 205 the lookup module determines if the personal cloud shared data storage area is already registered with the lookup server. If the personal cloud is not already registered, in step 210 the lookup server stores the administrative information in its personal cloud database to complete registration of the personal cloud and then in step 215 provides certain administrative information about the personal cloud to the host module. For example, the lookup module may only provide the host module with an acknowledgment of registration or the lookup module may provide summary personal cloud information including the IP_address:port_number combination for the personal cloud, the name of the personal cloud, default access control levels for the personal cloud, or other administrative information related to the registered personal cloud.

If, however, in step 205 the lookup module determines that the personal cloud is already registered, then the lookup module determines in step 220 if additional provided information (e.g., owner information, variable, etc.) matches the information stored at the lookup server for the personal cloud. If the additional information does not match, then the registration/management process loops back to begin with receiving administrative information about a personal cloud.

If the additional information does match the information stored at the lookup server for and existing personal cloud, as determined in step 220, then the management process begins. At least three management functions can be carried out by the lookup server module, including deleting a personal cloud, modifying a personal cloud, and transferring a personal cloud. In step 225 the type of management function is determined.

If the management function is determined to be delete, then in step 230 the previously identified personal cloud is deleted from the database of registered personal clouds at the lookup server. Next, in step 235 the lookup sever may send an instruction to the data storage device to delete or save the actual data in the shared data storage area. Finally, in step 240 a confirmation email is sent to the owner of the personal cloud and upon receiving an affirmative reply to the confirmation email, the delete action is finalized.

Alternatively, if the management function is determined to be modify, then in step 245 new information is received regarding the previously identified personal cloud. For example, the new information may include a new personal cloud name, new contact information, new access control permission information and the like. Next, in step 250 the lookup sever updates the existing personal cloud information or adds new personal cloud information to the existing personal cloud information (adding new information is also considered a modification). Finally, in step 240 a confirmation email is sent to the owner of the personal cloud and upon receiving an affirmative reply to the confirmation email, the modify action is finalized.

Alternatively, if the management function is determined to be transfer, then in step 255 new storage device information is received. For example, the new storage device information may include a new IP address and port number as well as related new information such as a new personal cloud name, new contact information, new access control permission information and the like. Advantageously, a transfer function allows an existing personal cloud device to be redeployed to new hardware without changing all of the administrative information for the personal cloud. Next, in step 260 the lookup sever may instruct the storage device to move or copy the actual data in the shared data storage area to the new hardware device. Finally, in step 240 a confirmation email is sent to the owner of the personal cloud and upon receiving an affirmative reply to the confirmation email, the transfer action is finalized.

Figure 4:
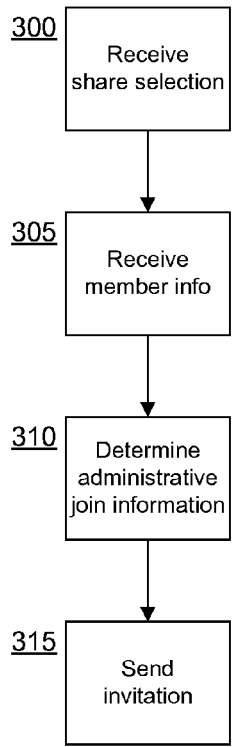
FIG. 4 is a flow diagram illustrating an example process for sending a network peer an invitation to join a distributed shared storage space according to an embodiment of the present invention.

FIG. 4 is a flow diagram illustrating an example process for sending a network peer an invitation to join a distributed shared storage space according to an embodiment of the present invention. In one embodiment, the process may be implemented by a host module such as previously described with respect to FIGS. 1 and 2A. Initially, in step 300 the host module receives a selection identifying an existing personal cloud shared data storage area to which the network peer will be invited to join. Next, in step 305 the host module receives certain network peer information and determines certain administrative join information as shown in step 310. For example, the network peer information may include an email address, a phone number for SMS communication or any other of a variety of digital communication addresses to which the invitation may be sent to the network peer. Finally, in step 315 the host module sends an invitation including the administrative join information to the network peer so that the network peer can use the administrative join information to gain access to the personal cloud shared data storage area.

Figure 5:
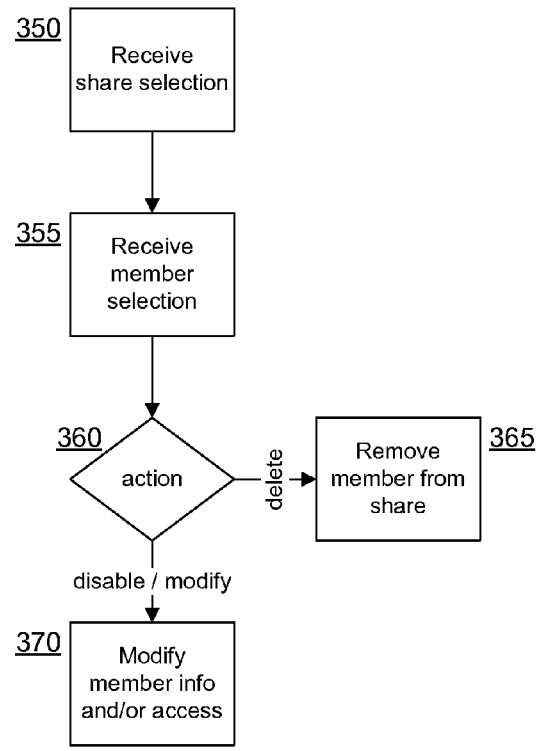
FIG. 5 is a flow diagram illustrating an example process for managing access to a distributed shared storage space according to an embodiment of the present invention.

FIG. 5 is a flow diagram illustrating an example process for managing access to a distributed shared storage space according to an embodiment of the present invention. In one embodiment, the process may be implemented by a host module such as previously described with respect to FIGS. 1 and 2A. Initially, in step 350 the host module receives a selection identifying an existing personal cloud shared data storage area for which member information will be updated or deleted. Next, in step 355 the host module receives a selection of a specific member to be update or deleted. Depending on the action to be carried out, as determined in step 360, the member is either removed from the access list for the selected personal cloud data storage area as shown in step 365 or the member information or member access permissions are modified as shown in step 370.

For example, deleting a network peer member may include modifying the network peer member access permissions to deny access to the personal cloud data storage area. In this fashion, the network peer may be prevented from using the original administrative join information to rejoin the personal cloud. Additionally, modifying a network peer's member information may include changing the network peer's name, contact information, or access permissions for the personal cloud shared data storage area.

Figure 6:
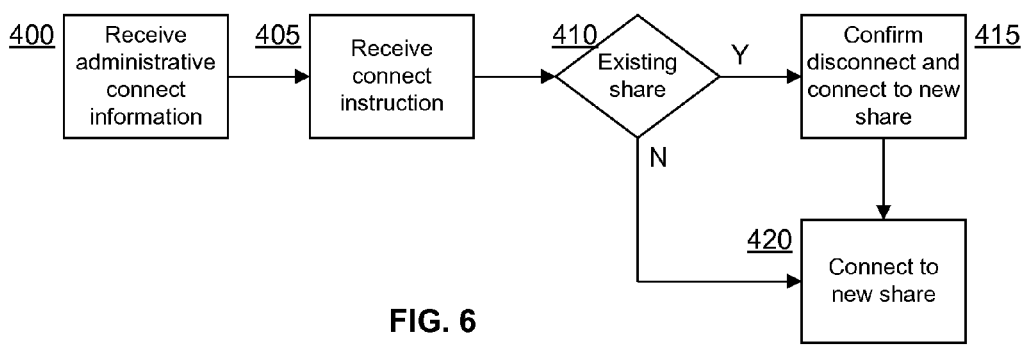
FIG. 6 is a flow diagram illustrating an example process for connecting to a distributed shared storage space according to an embodiment of the present invention.

FIG. 6 is a flow diagram illustrating an example process for connecting to a distributed shared storage space according to an embodiment of the present invention. In one embodiment, the process may be implemented by a client module such as previously described with respect to FIGS. 1 and 2C. Initially, in step 400 the client module receives administrative join information from a host module. For example the administrative join information may include an access code and a personal cloud name. The administrative join information may also include a network address for the lookup server. Next, in step 405, the client module receives an instruction to connect to the personal cloud shared data storage area.

In response to the instruction, in step 410 the client module determines if the network device is currently connected to a personal cloud and if so, in step 415 the client module determines if the connection to the current personal cloud should be terminated in order to connect to the new personal cloud. If the new personal cloud connection is desired, then the current personal cloud connection is terminated in step 415 and a connection to the new personal cloud is established in step 420. If there is no existing personal cloud connection as determined in step 410, then the client module establishes a connection to the personal cloud, as shown in step 420.

In an alternative embodiment, a client module may establish and maintain a plurality of simultaneous personal cloud shared data storage area connections. In such an embodiment, steps 410 and 415 can be eliminated such that the client module establishes a connection to the new personal cloud shared data storage area upon receiving the connect instruction regardless of the presence of any current personal cloud shared data storage area connections.

Figure 7:
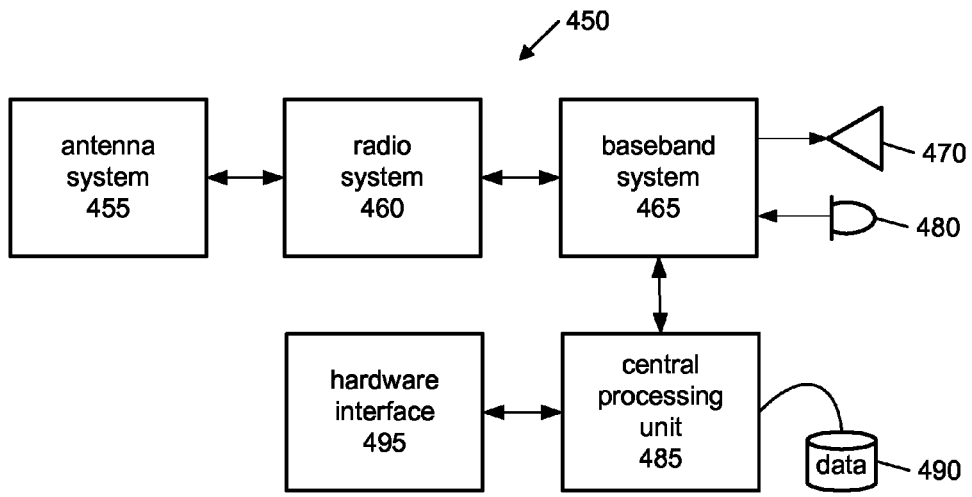
FIG. 7 is a block diagram illustrating an example wireless communication device that may be used in connection with various embodiments described herein.

FIG. 7 is a block diagram illustrating an example wireless communication device 450 that may be used in connection with various embodiments described herein. For example, the wireless communication device 450 may be used in conjunction with a network device, lookup server, or storage device as previously described with respect to FIG. 1. However, other wireless communication devices and/or architectures may also be used, as will be clear to those skilled in the art.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 2A-2C.

In this description, the term "computer readable medium" is used to refer to any media used to provide executable instructions (e.g., software and computer programs) to the wireless communication device 450 for execution by the central processing unit 485. Examples of these media include the data storage area 490, microphone 480 (via the baseband system 465), antenna system 455 (also via the baseband system 465), and hardware interface 495. These computer readable media are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 8:
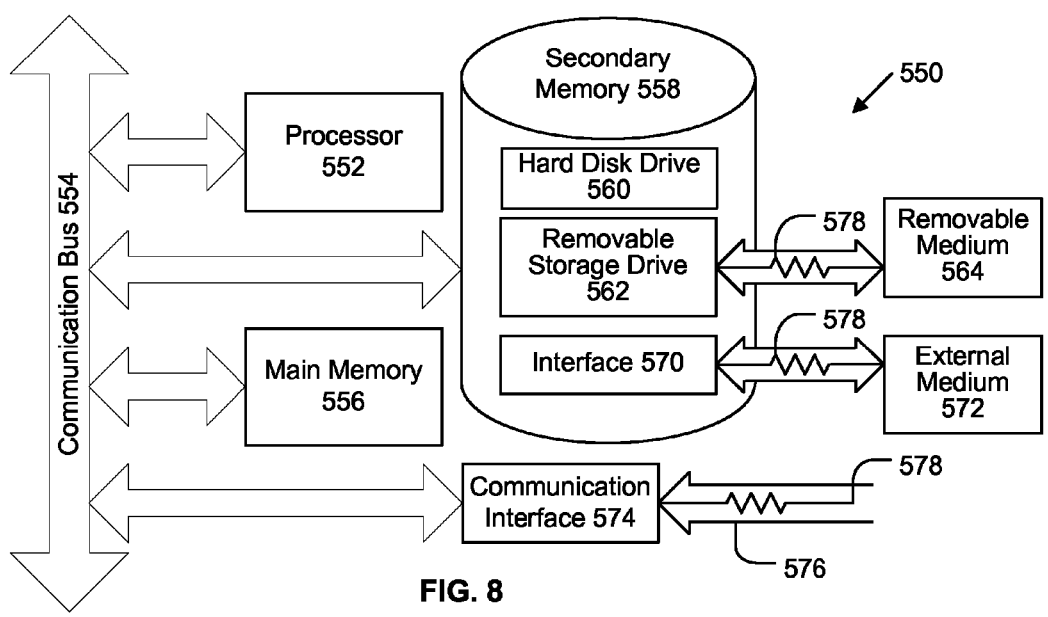
FIG. 8 is a block diagram illustrating an example computer system that may be used in connection with various embodiments described herein.

FIG. 8 is a block diagram illustrating an example computer system 550 that may be used in connection with various embodiments described herein. For example, the computer system 550 may be used in conjunction with a network device, lookup server, or storage device as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576.

Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method, comprising:
   requesting, from a lookup server, an internet protocol (IP) address for a shared data storage area that is to be established: receiving the IP address from the lookup server;
   identifying a key that is specific to a first device different from the lookup server, the first device being used to host the shared data storage area;
   combining the key and the IP address to generate a variable;
   providing the variable to the lookup server for registration of the shared data storage area with the lookup server, the registration at least in part establishing the shared data storage area;
   providing administrative information to the lookup server for the registration of the shared data storage area, the administrative information being encrypted using the variable for the providing to the lookup server;
   encrypting and decrypting, using the variable, future communications between the shared data storage area and lookup server;
   identifying at least one request from a peer device to the first device to modify the shared data storage area hosted on the first device, the request indicating the variable; and
   responsive to identifying the variable as indicated in the request, providing an email to an email account associated with the shared data storage area, the email containing information pertaining to the request to modify the shared data storage area.

2. The method of claim 1, wherein the administration information comprises a name for the shared data storage area and a port number associated with the shared data storage area.

3. The method of claim 1, wherein the method comprises:
once the variable as indicated in the request is identified, validating the variable as indicated in the request prior to providing the email.

4. The method of claim 3, wherein the variable as indicated in the request is validated based on a comparison to the variable as provided to the lookup server.

5. A method, comprising:
requesting, from a lookup server, an internet protocol (IP) address for a shared data storage area that is to be established;
receiving the IP address from the lookup server;
identifying a key that is specific to a first device different from the lookup server, the first device being used to host the shared data storage area;
combining the key and the IP address to generate a variable;
providing the variable to the lookup server for registration of the shared data storage area with the lookup server, the registration at least in part establishing the shared data storage area;
providing administrative information to the lookup server for the registration of the shared data storage area, the administrative information being encrypted using the variable for the providing to the lookup server;
identifying at least one request to modify the shared data storage area on a first device, the request indicating the variable; and
based on validation of the variable as indicated in the request, permitting modification of the shared data storage area.

6. The method of claim 5, wherein the administration information comprises at least one of a name for the shared data storage area and a port number associated with the shared data storage area.

7. The method of claim 5, wherein the variable as indicated in the request is validated based on a comparison to the variable as provided to the lookup server.

8. A method, comprising:
requesting, from a lookup server, an internet protocol (IP) address for personal cloud storage;
receiving the IP address from the lookup server;
identifying a key that is specific to a first device different from the lookup server, the first device being used to host the personal cloud storage;
combining the key and the IP address to generate a variable;
providing the variable to the lookup server for registration of the personal cloud storage with the lookup server, the registration at least in part establishing the personal cloud storage;
identifying at least one request to modify personal cloud storage, the request comprising the variable; and
based on validation of the variable from the request, permitting modification of the personal cloud storage.

9. The method of claim 8, wherein the administration information comprises at least one of a name for the personal cloud storage and a port number associated with the personal cloud storage.

10. The method of claim 8, wherein the variable from the request is validated based on a comparison to the variable as provided to the lookup server.

11. A method, comprising:
requesting, from a lookup server, an internet protocol (IP) address for personal cloud storage;
receiving the IP address from the lookup server;
identifying a key that is specific to a first device different from the lookup server, the first device being used to host the personal cloud storage;
combining the key and the IP address to generate a variable;
providing the variable to the lookup server for registration of the personal cloud storage with the lookup server, the registration at least in part establishing the personal cloud storage;
providing administrative information to the lookup server for the registration of the personal cloud storage, the administrative information being encrypted using the variable for the providing to the lookup server;
encrypting and decrypting, using the variable, future communications between the personal cloud storage and lookup server;
identifying at least one request to modify the personal cloud storage, the request to modify the personal cloud storage indicating the variable;
based on validation of the variable as indicated in the request, modifying the personal cloud storage based on the at least one request to modify the personal cloud storage.

12. The method of claim 11, wherein the administration information comprises at least one of a name for the personal cloud storage and a port number associated with the personal cloud storage.

13. The method of claim 11, wherein the variable from the request is validated based on a comparison to the variable as provided to the lookup server.

14. A first device, comprising:
a processor;
storage accessible to the processor and bearing instructions executable by the processor to:
request, from a lookup server, an internet protocol (IP) address for personal cloud storage;
receive the IP address from the lookup server;
identify a key that is specific to the first device, the first device being used to host the personal cloud storage;
combine the key and the IP address to generate a variable;
provide the variable to the lookup server for registration of the personal cloud storage with the lookup server;
identify at least one request to modify the personal cloud storage, the request to modify the personal cloud storage indicating the variable; and
based on validation of the variable as indicated in the request, permit modification of the personal cloud storage based at least in part on the request to modify the personal cloud storage.

15. The first device of claim 14, wherein the instructions are executable by the processor to:
provide administrative information to the lookup server for the registration of the personal cloud storage, the administrative information being encrypted using the variable.

16. The first device of claim 15, wherein the administration information comprises at least one of a name for the personal cloud storage and a port number associated with the personal cloud storage.

17. The first device of claim 14, wherein the instructions are executable by the processor to:
encrypt and decrypt, using the variable, future communications between the personal cloud storage and lookup server.

18. The first device of claim 14, wherein the variable as indicated in the request is validated based on a comparison to the variable as provided to the lookup server.

\* \* \* \* \*